(12) United States Patent
Cajiga et al.

(10) Patent No.: US 12,448,273 B2
(45) Date of Patent: Oct. 21, 2025

(54) MODULAR FUEL TANK ASSEMBLY AND METHOD OF CONSTRUCTION

(71) Applicant: CAPAT LLC, Miami, FL (US)

(72) Inventors: Jose A. Cajiga, Miami, FL (US);
Arturo Cajiga Villar, Miami, FL (US);
Vicente Cajiga Villar, Miami, FL (US);
Alexandra Cajiga, Miami, FL (US)

(73) Assignee: Capat LLC, Miami, FL (US)

( * ) Notice: Subject to any disclaimer, the term of this patent is extended or adjusted under 35 U.S.C. 154(b) by 0 days.

(21) Appl. No.: 17/383,564

(22) Filed: Jul. 23, 2021

(65) Prior Publication Data

US 2022/0024751 A1 Jan. 27, 2022

Related U.S. Application Data

(60) Provisional application No. 63/055,640, filed on Jul. 23, 2020.

(51) Int. Cl.
| | | |
|---|---|---|
| *B67D 7/78* | (2010.01) | |
| *B60S 5/02* | (2006.01) | |
| *B65D 88/00* | (2006.01) | |
| *B67D 7/04* | (2010.01) | |
| *B67D 7/32* | (2010.01) | |
| *F02M 37/00* | (2006.01) | |

(52) U.S. Cl.
CPC .................. *B67D 7/78* (2013.01); *B60S 5/02* (2013.01); *B65D 88/005* (2013.01); *B67D 7/04* (2013.01); *B67D 7/3272* (2013.01); *F02M 37/0088* (2013.01)

(58) Field of Classification Search
CPC .......... B67D 7/04; B67D 7/78; B67D 7/3272; B60S 5/02; B65D 88/005; F02M 37/0088
See application file for complete search history.

(56) References Cited

U.S. PATENT DOCUMENTS

| | | | | |
|---|---|---|---|---|
| 2,552,119 | A | * 5/1951 | Scharenberg | .......... B64D 37/06 |
| | | | | 220/666 |
| 3,827,455 | A | * 8/1974 | Lee | ...................... B65D 90/503 |
| | | | | 220/88.1 |
| 4,251,005 | A | * 2/1981 | Sons | ...................... B65D 88/06 |
| | | | | 220/563 |
| 4,511,105 | A | * 4/1985 | Morrisey | .............. B29C 53/602 |
| | | | | 244/135 R |
| 5,244,307 | A | 9/1993 | Wokas | |

(Continued)

OTHER PUBLICATIONS

Corresponding PCT Application No. PCT/US2021/042893 International Search Report and Written Opinion dated Nov. 3, 2021.

*Primary Examiner* — Timothy L Maust
(74) *Attorney, Agent, or Firm* — Grogan, Tuccillo & Vanderleeden, LLP (57) ABSTRACT

A modular fuel tank assembly includes a first fuel tank body defining a first inner volume and a second fuel tank body defining a second inner volume, where the first inner volume is spatially separate from the second inner volume. A connecting conduit is in fluid communication with the first fuel tank and the second fuel tank. The first fuel tank, the second fuel tank and the connecting conduit each define a double-walled structure having an inner wall and an outer wall spaced apart from the inner wall.

7 Claims, 7 Drawing Sheets

(56) References Cited

U.S. PATENT DOCUMENTS

| | | | | |
|---|---|---|---|---|
| 6,227,230 | B1* | 5/2001 | Huh | F17C 3/00 |
| | | | | 137/255 |
| 6,547,091 | B2* | 4/2003 | Hagenbuch | B60P 3/2235 |
| | | | | 220/4.12 |
| 8,573,242 | B2* | 11/2013 | Cajiga | B60S 5/02 |
| | | | | 137/15.01 |
| 8,667,690 | B2* | 3/2014 | Cajiga | B23P 11/00 |
| | | | | 29/897.3 |
| 8,794,259 | B2* | 8/2014 | Daneshgari | B60K 15/03 |
| | | | | 137/263 |
| 9,181,078 | B2* | 11/2015 | Cajiga | B67D 7/04 |
| 9,551,461 | B2* | 1/2017 | Boyer | F17C 5/02 |
| 9,759,383 | B2* | 9/2017 | Cajiga | F17C 5/007 |
| 10,710,867 | B2* | 7/2020 | Cajiga | B60S 5/02 |
| 10,774,993 | B2* | 9/2020 | Cajiga | B67D 7/00 |
| 11,047,529 | B2* | 6/2021 | Kuczek | F17C 1/00 |
| 2004/0226607 | A1 | 11/2004 | Hervio et al. | |
| 2014/0026597 | A1* | 1/2014 | Epstein | F17C 13/005 |
| | | | | 62/53.2 |
| 2014/0166662 | A1* | 6/2014 | Snyder | F17C 13/00 |
| | | | | 220/560.1 |
| 2015/0060466 | A1* | 3/2015 | Lind | B65D 81/3809 |
| | | | | 220/560.11 |
| 2015/0069070 | A1* | 3/2015 | Iwaya | F02M 37/0082 |
| | | | | 220/563 |
| 2016/0161058 | A1* | 6/2016 | Moddemann | F17C 3/06 |
| | | | | 220/560.04 |
| 2016/0178127 | A1* | 6/2016 | Oh | B60S 5/02 |
| | | | | 141/98 |
| 2017/0225938 | A1 | 8/2017 | Cajiga et al. | |
| 2019/0071301 | A1 | 3/2019 | Cajiga et al. | |

* cited by examiner

MODULAR FUEL TANK ASSEMBLY AND METHOD OF CONSTRUCTION

CROSS-REFERENCE TO RELATED APPLICATIONS

This application claims the benefit of U.S. Provisional Application Ser. No. 63/055,640, filed on Jul. 23, 2020, which is hereby incorporated by reference herein in its entirety.

FIELD OF THE INVENTION

The present invention relates, generally, to fuel tanks and, more particularly, to modular, multi-walled fuel tank assembly for the storage and supply of various liquified and gaseous fuels.

BACKGROUND OF THE INVENTION

Fuel distribution stations are in heavy global demand, as more and more automobiles are put into service on roads to meet the transportation demands of an ever-expanding population. The construction and operation of conventional fuel distribution and service stations, however, are lengthy, costly and resource-consuming undertakings. Surveys and studies of anticipated demand must be commissioned, the station must be designed in a configuration sufficient to meet the anticipated demand, permits must be pulled, and a lengthy construction process must be commenced and completed before a single gallon of gasoline may be pumped.

Notwithstanding resource-consuming undertakings for their construction and operation, conventional fuel distribution stations have numerous drawbacks with respect to environmental, safety, and maintenance concerns.

First, fuel distribution stations are classified as objects of a potentially high environmental impact. For example, automotive fuels are typically stored in underground tanks from which the fuel is pumped to a fuel dispenser before transfer into an automobile. These tanks are typically constructed of metal or fiberglass. Underground installation of these tanks requires relatively extensive excavation and coverage, thereby creating many potential problems. One known problem associated with known underground fuel tanks is leakage or seepage into the surrounding soil. This is particularly true of metallic tanks, which can corrode or degrade over time, especially in moist soil. Seepage into the surrounding soil results both in the steady loss of fuel and environmental (soil and water) pollution. Moreover, in case of flooding, the tanks installed underground are inefficient and the fuel in them may be contaminated with water and with sediments within the water.

Moreover, known fuel tanks are typically buried underground beneath the structure of the station with a thick concrete disposal block on top of the tank, making it difficult to perform maintenance work on the fuel tanks, when required. Once a fuel tank is found to be in need of repair or replacement, the cost of repairing and replacing the underground fuel tank can be extremely expensive.

In addition to the above, the use of alternative energy sources is starting to become more prevalent in fuel markets. Indeed, the use and demand of alternative energy fuel for transportation is increasing at a rapid pace, and the types of fuel demanded and the consumption rates thereof can be expected to increase drastically from what has been seen to date. Accordingly, new generations of fuel distribution stations and related tank storage assemblies must be flexible in terms of their size and the types of fuel that they can store and dispense in response to dynamically changing markets. There is a need for fuel distribution stations that are able to distribute different types of fuel, such as gasoline, diesel, natural gas, hydrogen, and methanol, as well as electricity to quickly charge electric cars. In markets that start small and subsequently expand, it is desirable to expand fuel storage capabilities or contract should needs dictate. However, underground tanks in the conventional fuel stations are not designed to store different types of fuel, and other facilities are needed to store equipment and to perform processes needed to produce certain types of fuel and energy to deliver to automobiles. Similarly, underground fuel tanks are not capable of expansion or reduction as needed.

With the foregoing problems and concerns in mind, it is the general object of the present invention to provide a modular, multi-walled fuel storage tank assembly that is capable of safely storing a variety of fuel types and which is more environmentally friendly, safe to operate, more easily be modified or reconfigured to meet changing fuel demands, and is more convenient to maintain, than existing fuel tank assemblies.

SUMMARY OF THE INVENTION

With the foregoing concerns and needs in mind, it is the general object of the present invention to provide a modular fuel tank assembly.

It is another object of the present invention to provide a modular fuel tank assembly that can be easily and cost-effectively configured to store and dispense differing quantities of fuel, by enabling modular components of the whole to be transported—together or separately—and thereafter assembled, or disassembled—on site, in dependence on the needed or desired size of the tank.

It is another object of the present invention to provide a modular fuel tank assembly that is much easier and less costly to transport as compared to large capacity single-body tanks that require, e.g., lowboys and increased hazards due to road size limitations, weight, and the like.

It is another object of the present invention to provide a modular fuel tank assembly for large storage capacity that can be transported according to ISO standards on vessels (i.e., shipping container sized), to then be assembled at the destination to reflect the needed, total capacity.

It is another object of the present invention to provide a modular fuel tank assembly for large storage capacity that can be set up to accommodate differing capacities and types of fuels.

It is another object of the present invention to provide a modular fuel tank assembly that is environmentally friendly.

It is another object of the present invention to provide a modular fuel tank assembly that minimizes the risk of contaminating the soil and underground water, when buried.

It is another object of the present invention to provide a modular fuel tank assembly that is less costly to construct and maintain than existing fuel tanks.

It is another object of the present invention to provide a modular fuel tank assembly that enables maintenance and repair work to be more conveniently carried out.

It is another object of the present invention to provide a modular fuel tank assembly capable of storing various types of fuel such as gasoline, diesel, CNG (compressed natural gas), LPG (liquefied petroleum gas), hydrogen and methanol.

It is another object of the present invention to provide a modular fuel tank assembly that can supply various types of fuel such as gasoline, diesel, biodiesel, hydrogen, methanol, CNG, LPG and LNG.

It is another object of the present invention to provide a modular fuel tank assembly having exchangeable equipment assemblies, to replace equipment contained by such assemblies, and to perform maintenance on equipment without having long periods of down time.

It is another object of the present invention to provide a modular fuel tank assembly for storing fuel in an elevated position above ground.

It is another object of the present invention to provide a modular fuel tank assembly that is compliant with all relevant Codes and Standards including UL142, UL2085, and NFPA30A (herein incorporated by reference).

It is another object of the present invention to provide a modular fuel tank assembly with external and internal structural elements that guarantee the structural integrity of the system when assembled and/or installed.

It is another object of the present invention to provide a method of assembling to provide a modular fuel tank assembly from components via welds and/or flanges.

It is another object of the present invention to install to provide a modular fuel tank assembly in an elevated canopy.

These and other objects of the present invention, and their preferred embodiments, shall become clear by consideration of the specification, claims and drawings taken as a whole.

Thus, according to an embodiment of the present invention, a modular fuel tank assembly includes a first fuel tank body defining a first inner volume and a second fuel tank body defining a second inner volume, where the first inner volume is spatially separate from the second inner volume. A connecting conduit is in fluid communication with the first fuel tank and the second fuel tank, and each of the first fuel tank, the second fuel tank and the connecting conduit define a double-walled structure having an inner wall and an outer wall spaced apart from the inner wall.

BRIEF DESCRIPTION OF DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
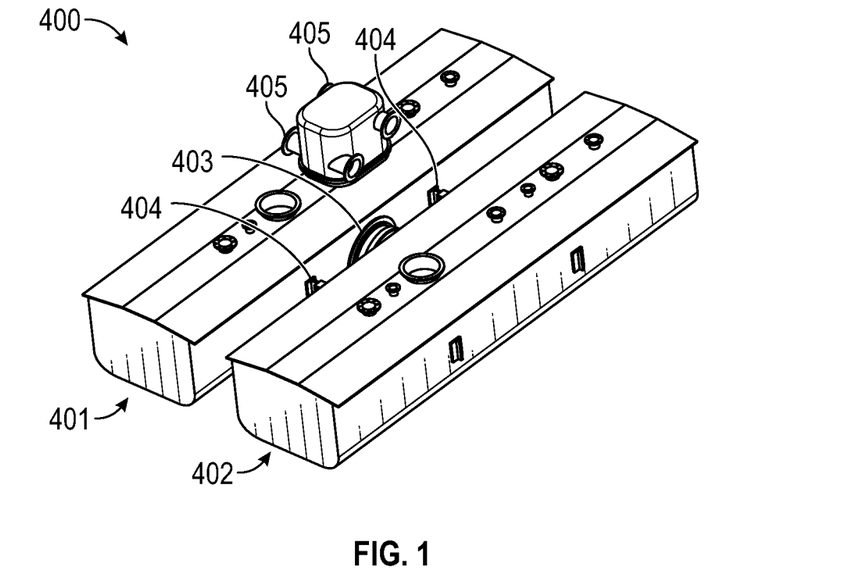
FIG. 1 is an isometric view of a modular fuel tank assembly according to an embodiment of the present invention.

As shown in FIG. 1, a modular fuel tank assembly 400 according on one embodiment of the present invention is illustrated. The modular fuel tank assembly 400 includes a plurality of tank bodies or compartments, e.g., first tank body 401 and second tank body 402, and a connecting conduit body 403 extending between the first tank body 401 and the second tank body 402 and providing fluid communication between the tank bodies 401, 402.

While two tank assemblies, 401 and 402, are shown in FIG. 1, it will be readily appreciated by one of ordinary skill that any number of fuel tank bodies 401/402 may be integrated with one another via one or more connecting conduit bodies 403, or alternatively exist as a sole tank body, without departing from the broader aspects of the present invention.

Moreover, it is an important aspect of the present invention that, regardless of the number of tank bodies involved, the modular fuel tank assembly 400 functions as a unity fuel tank, and which evidences certain advantages over traditional, large-volume fuel tanks, currently known in the art.

Indeed, traditional fuel tanks are specifically sized according to their intended use, and after such manufacture, it is difficult if not impossible to change the size of traditional fuel tanks. As will be further appreciated, the control systems and related pumps for traditional fuel tanks are individual to each tank, thus increasing costs. Lastly, traditional fuel tanks having large volumes are not only more difficult to manufacture, but involved increased costs and difficulties in transportation, installation and maintenance.

As illustrated in FIG. 1, and as will be discussed in more detail in connection with FIGS. 2-10, the modular fuel tank assembly 400 is therefore capable of utilizing any number of needed connecting conduit bodies 403, with any number of fuel tank bodies 401/402/etc., in order to accommodate any desired volume of fuel storage and dispensing, and by utilizing only a single integrated pump.

As will become clear by reference to the following description and associated drawings, the modular fuel tank assembly 400 can be adapted in real-time to not only form a fuel storage and dispensing tank of any size—even a tank having a very large capacity—but may thereafter be easily modified in the field to accommodate changing size and volume requirements.

Known large-capacity tanks suffer from many inherent drawbacks, including, firstly, their sheer size, and therefore, thickness of walls and associated overall weight. Moreover, any transport of large-capacity tanks is prohibitively expensive, and sometimes logistically impossible, requiring specialized vehicles and transport routes, and thereafter, large material handling equipment for final positioning.

It is therefore an important aspect of the present invention that the modular fuel tank assembly 400 acts essentially as a unitary fuel tank, without any of the aforementioned drawbacks or limitations. The double-walled nature of the fuel tank bodies 401/402 mean that the overall thickness and weight of the double-wall structure is less than would be needed if manufacturing a comparative single-wall tank of a similar size. Most importantly, however, is that when two or more fuel tank bodies 401/402 of the present invention are linked by one or more of the connecting conduit bodies 403, a fuel tank of extremely large size and capacity can be easily formed, on site, without the difficulties inherent with any single-body tank of similar size.

Indeed, and as will be appreciated, by having not only the individual fuel tank bodies 401/202 be themselves double-walled, but also having the connecting conduit body 403 be double-walled in nature, the present invention is capable of providing a modular, pressure-compliant, overall structure that not only meets any desired capacity requirement, but does so in a manner that is more efficient to manufacture, transport and operate.

Returning to FIG. 1, and in accordance with one embodiment of the present invention, the tank bodies 401, 402 extend generally parallel to one another and are fluidly connected to one another via the connecting tank body 403 which extends generally perpendicularly between the tank bodies 401, 402. While FIG. 1 illustrates the tank bodies 401, 402 as being generally rectangular in shape/cross-section, it is contemplated that the tank bodies 401, 402 may instead be circular in cross-section and have dome-shaped opposing ends, or be of any cross-sectional shape, without departing from the broader aspects of the present invention. In addition, as shown in FIG. 1, the connecting tank body 403 is preferably cylindrical in shape. While FIG. 1 show the use of a single connecting tank body 403 extending between the tank bodies 401, 402, in other embodiments, more than one connecting tank body 403 may be utilized to provide multiple fluid passageways between the first and second tank bodies 401, 402 without departing from the broader aspects of the present invention.

In an embodiment, the connecting tank body 403 may be integrated with the first and second tank bodies 401 via welding or a bolted flange, although other connection means known in the art may also be utilized without departing from the broader aspects of the invention. Importantly, the tank bodies 401, 402, 403 are arranged in such a manner that fuel within the modular fuel tank assembly 400 may be drawn out of the assembly 400 using a single sump/fuel pump, as discussed below. For example, in an embodiment, the low point in the modular fuel tank assembly 400 may be an area within the first tank body 400 at which a sump/fuel pump is located, such that upon drawing down of the fuel within the assembly 400, fuel flows from the second tank body 402, through the connecting tank body 403, and into the first tank body 400, where it can be pumped out of the assembly 400, as needed.

With further reference to FIG. 1, one or more structural members or struts 404 extend between the tank bodies 401, 402, and generally parallel to the connecting tank body 403. The structural members 404 may be formed as I-beams, for example, and join, integrate, and distribute the structural loads for the of the tank bodies 401, 402.

In a preferred embodiment, the tank bodies 401, 402 and connecting tank body 403 have a double wall construction, comprised of an outer wall, an inner wall, and fire and ballistic resistant material, such as but not limited to cellular concrete or pyrolite, within the space in-between the outer wall and inner wall. The double wall structure is therefore capable of preventing the fuels inside the fuel tanks from catching on fire for a minimum of two hours during a fire.

As further shown in FIG. 1, the modular fuel tank assembly 400 further includes an equipment compartment 405 associated with at least one of the tank bodies, e.g., first tank body 401. The equipment compartment 405 may house pumps, sensors, relays, access ports, etc. and may be configured in any suitable position as needs dictate. The equipment compartment 405 may also be configured to permit access for the repair and replacement of equipment without necessitating the shutdown of the fuel distribution system.

Figure 2:
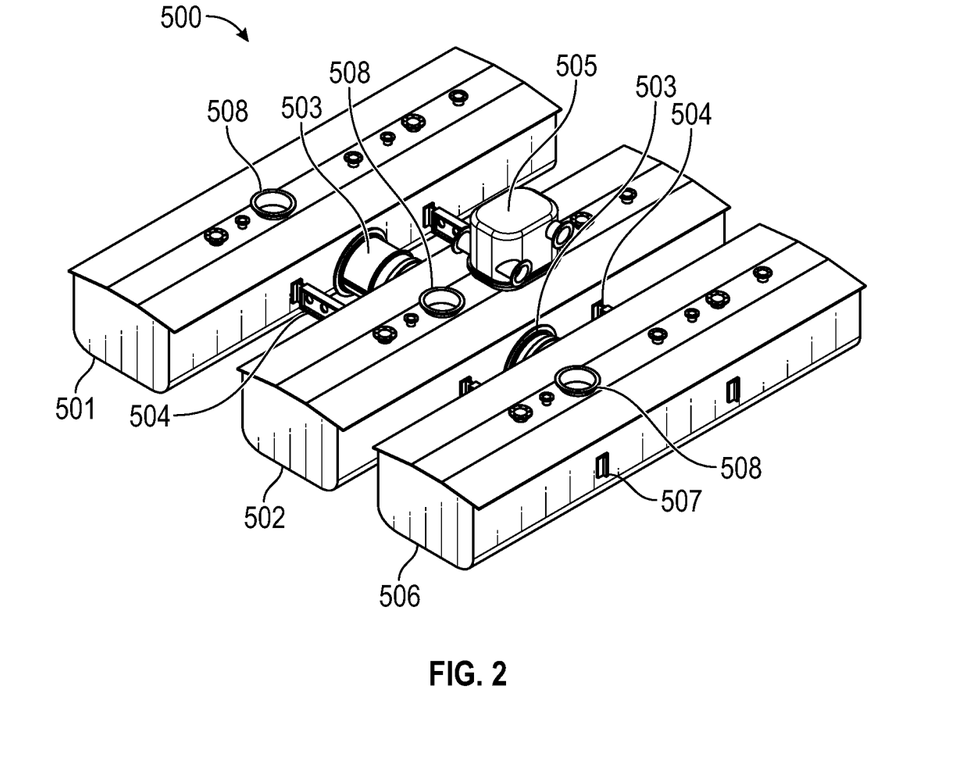
FIG. 2 is an isometric view of a modular fuel tank assembly according to another embodiment of the present invention.

With reference to FIG. 2, it is contemplated that more than two tank bodies may be utilized to provide an increased fuel storage capacity. For example, as shown therein, a modular fuel tank assembly 500 includes first, second and third tank bodies 501, 502, 506 arranged generally parallel to one another, and respective connecting tank bodies 503 providing fluid passageways between the first and second tank bodies 501, 502, and second and third tank bodies 502, 506, respectively. As indicated above, structural members or struts 504 further connect and distribute structural loads across the modular fuel tank assembly 500. As shown in the embodiment of FIG. 2, an equipment compartment 505 is associated with the second tank body 502, and the tank bodies 501, 502, 506 and connecting tank bodies 503 are configured such that fuel is permitted to drain via gravity from the first tank body 501 and the third tank body 506 into the second tank body 502 through the connecting tank bodies 503, so that all fuel within the modular fuel tank assembly 500 may be pumped out using a single pump. As further shown in FIG. 2, each tank body may be configured with a mounting connector 507 at mount points oriented on the lateral sides of the tank bodies, which are configured to facilitate the interconnection of additional tank bodies and/or for facilitating connection of the storage apparatus to, e.g., an elevated (or traditional ground-buried) fuel station. Each tank body may also have an access opening 508 at the top thereof, allowing for a person to access the interior of the tank for inspection, repair and servicing.

Figure 3:
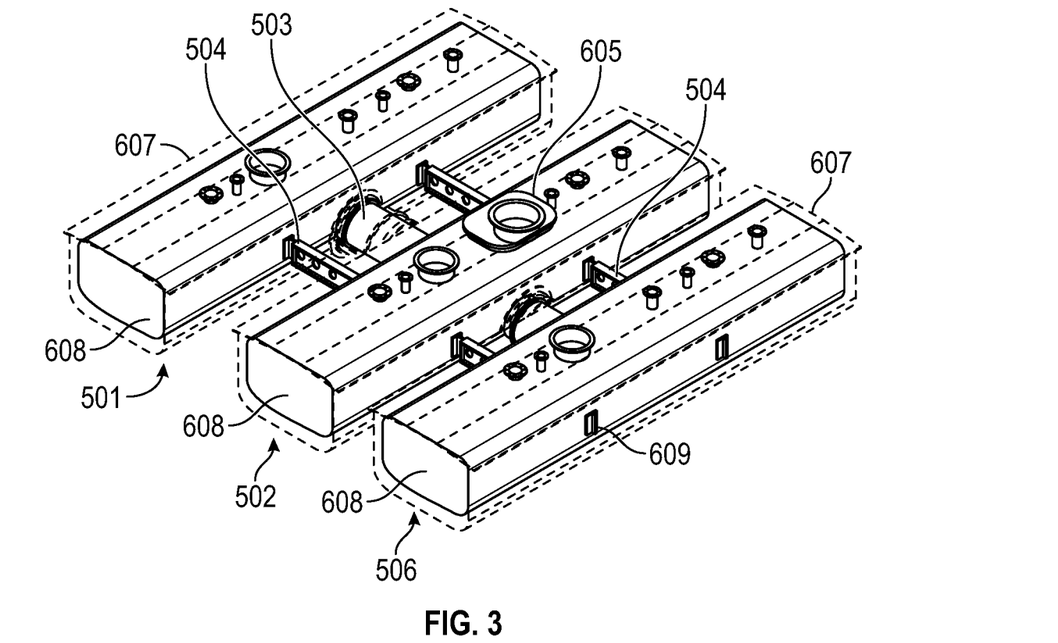
FIG. 3 is an isometric, partial transparent view of the fuel storage apparatus of FIG. 2.

Turning to FIG. 3, the dual/multi-walled structure of the modular fuel tank assembly 500 of FIG. 2 is illustrated. As shown in FIG. 3, an outer wall 607 of the tank bodies 501/502/506, and of the connecting tank 503, is shown in phantom. As will therefore be appreciated, tank bodies 501/502/506, and connecting tank body 503, are each comprised of outer wall 607 and inner wall 608 nested within the outer wall 607. In certain embodiments, the inner wall 608 is built to the UL142 specification and the outer wall 607 is built to the UL142 specification (or, as will be appreciated, any other specification or requirement, as needed). Structural tank connectors 504 are integrated with the outer wall 607 wall via mount points 609. Also visible on the outer wall 607 of the second tank 502 is the outline indicating the position of equipment compartment 605.

It will be readily appreciated that by ensuring that the connecting tank bodies 603 are themselves of a similar multi-walled construction as are fuel tanks 501/502/506, the present invention provides for security and safety during the transfer of fuel from one of the fuel tanks 501/502/506, to any other of these tanks. Moreover, it is an important aspect of the present invention that the mount points 609 for the structural tank connectors 504 are connected to only the outer wall/shell 607 of the fuel tanks 501/502/506, thus isolating the inner wall/shell 608 from any mechanical stress caused or communicated by the mount points 609 and the structural tank connectors 504 to the outer wall/shell 607.

Figure 4:
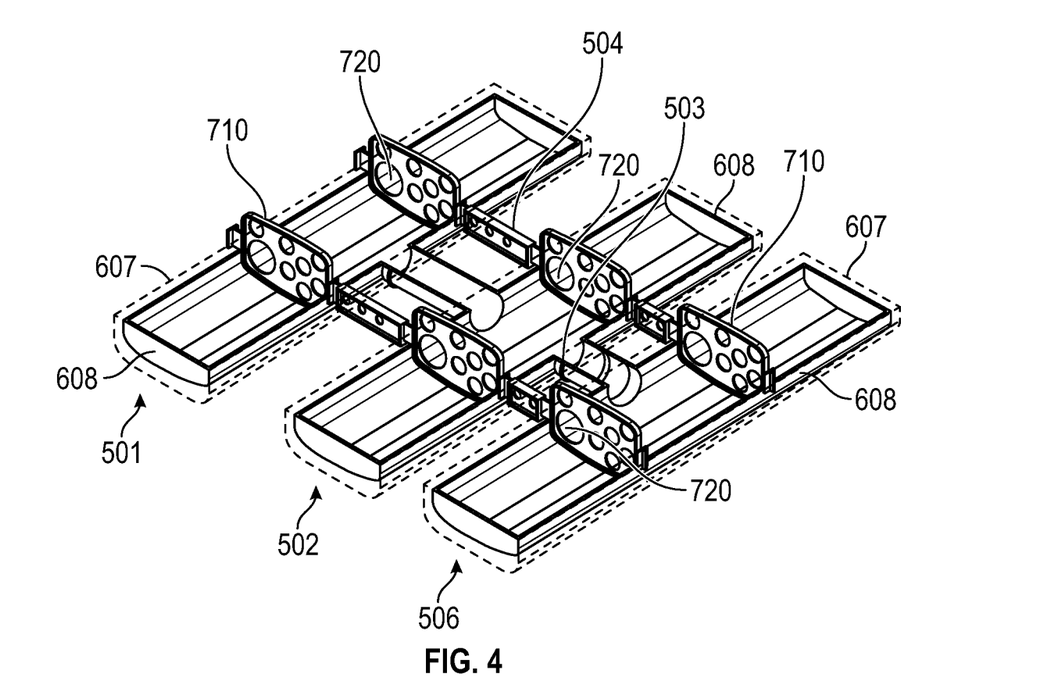
FIG. 4 is an isometric cut-away view of the of the fuel storage apparatus of FIG. 2.

Turning now to FIG. 4, a cross-sectional view of the modular fuel tank assembly 500 of FIG. 2, is shown. As illustrated therein, each tank body 501, 502, 506 includes at least one, and preferably a plurality of, structural baffles 710 that extend across the interior space within each tank body. As shown therein, and according to one embodiment of the present invention, the structural baffles 710 are longitudinally aligned with the structural support members 504, in order for the modular fuel tank assembly 500 to act structurally as a single, large-volume fuel tank.

Importantly, therefore, this alignment between the outer support members 504 and internal structural baffles 710 provides an integrated support member that effectively extends across the entire width of the modular fuel tank assembly 500. In addition to providing for structural rigidity and support to the tank bodies and the modular fuel tank assembly 500 as a whole, the interior structural baffles 710 also include a plurality of through-holes or apertures which allow for the free flow of fuel throughout the longitudinal extent of the primary tank bodies.

In addition, and as also shown in FIG. 4, at least one of the apertures 720 is sized so as to allow a person to crawl through the baffles 710 as necessary for inspection, servicing or repair. Still further, the baffles 710, in addition to providing structural support, serve as a wave-break, preventing the uncontrolled movement of fuel in a wave-like manner throughout the primary tank bodies, which could otherwise compromise the integrity of the apparatus. While FIG. 4 illustrates the use of a pair of struts 504 interconnecting each tank, and a pair of baffles 710 within each tank, more or fewer than two struts and baffles may be utilized without departing from the broader aspects of the invention.

Figure 5:
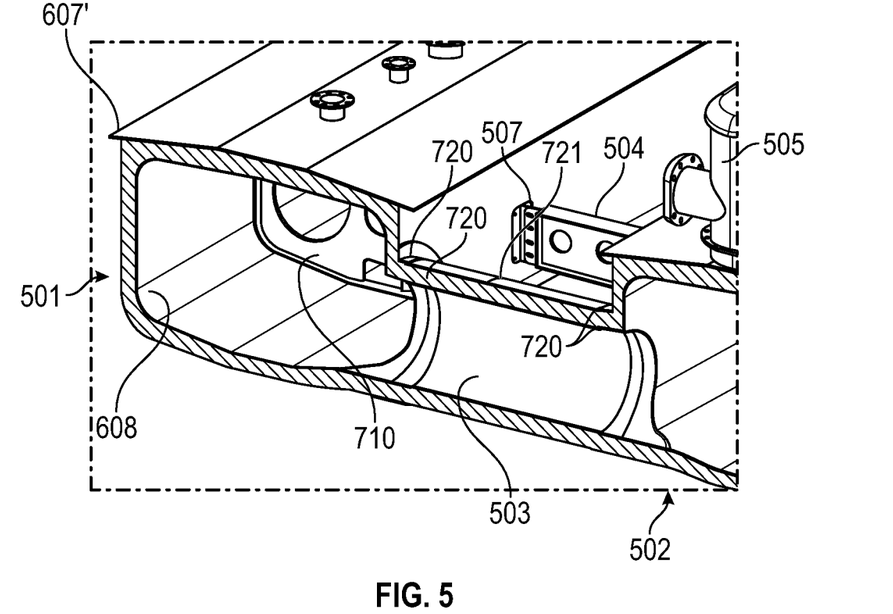
FIG. 5 is an isometric, detail view of a portion of the fuel storage apparatus of FIG. 2, illustrating a welded configuration.

Referring now to FIG. 5, a more detailed view of the interface between the tank bodies 501 and 502, and the connecting tank body 503, is shown. Visible are outer 607 and inner 608 nested compartments and interior structural support plate 710. Also visible in cutaway form is secondary tank body 503. As shown therein, the secondary tank body 503 is of the double wall construction described above, and is connected to the outer 607 and inner 608 nested walls of the tank bodies 501/502, respectively, by fillet welds 720. Butt welds 721 may be used to assembly the connecting tank body 503 in the field. Also visible is structural tank connector/strut 504, equipment compartment 505, and mount point 507.

Figure 6:
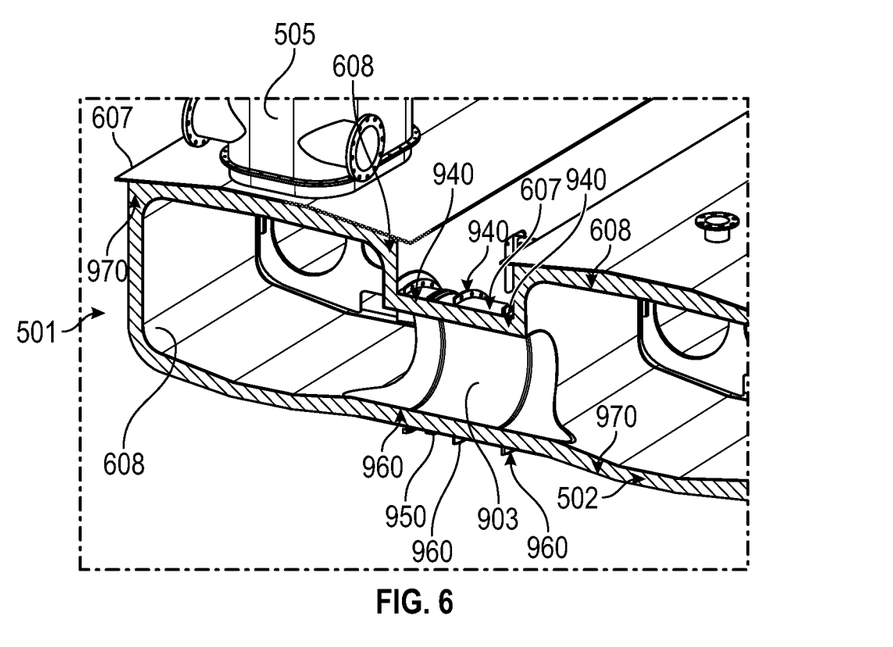
FIG. 6 is an isometric, detail view of a portion of the fuel storage apparatus of FIG. 2, illustrating a bolted configuration according to another embodiment of the present invention.

With reference to FIG. 6, the connecting tank bodies (represented here as connecting tank body 903) may be integrated with the inner and outer walls 607, 608 of the tank bodies 501/502 using UL flanges 940 and bolts. An expansion joint 950 may be provided and configured to allow for the thermal expansion of the system. Within the flange joints, suitable gaskets as known in the art are provided, in this instance, high temperature seals for hydrocarbons. It is envisioned that upon assembly of the outer 607 and inner 608 nested walls, the interstitial space formed therebetween is filled with a fire-retarding cellular concrete or other suitable material that may be pre-poured, molded, or otherwise filled into the space. In addition to supporting the inner wall 608, the integrated material may further serve in insulative and/or fire-retarding capacities and encompasses gels, particulate solids, zeolites, glasses, aerogels, and the like. In certain embodiments pre-cast halves of cellular foam are provided for assembly and incorporation. In additional embodiments, a sensor for leak detection is placed into the interstitial space formed between the outer 607 and inner 608 nested walls.

With further reference to FIGS. 1-6, it will be appreciated that while the structural connectors 504 are partially integrated into the double wall structure of the tank bodies, the connectors 504 do not reach the inner walls 608 of the tank bodies. This provides the ability to release the pressure generated by the thermal expansion and contraction due to the temperature changes over the seasons.

Upon assembly from either raw stock or pre-fabricated parts, each modular fuel storage apparatus may be tested according various standards, codes, and specifications. By way of non-limiting example and without being bound by specific theories of interpretation or application, the following codes may require:

UL142
  Each tank type may be fabricated in a combination of various shapes (cylindrical, rectangular or round) and orientations (horizontal, vertical) with or without multiple compartments, as covered in this Standard.
UL2085
  Tanks covered by these requirements are fabricated, inspected, and tested for leakage before shipment from the factory as completely assembled units.
  All openings shall be located above the maximum liquid level.
NFPA 30A
  4.3.2.3 Tanks storing liquid motor fuels at an individual site shall be limited to a maximum individual capacity of 45,400 L (12,000 gal) and aggregate capacity of 181,700 L (48,000 gal)
  22.11.4.1 The capacity of the listed primary tank for Classes I, II, and IIIA liquids shall not exceed 50,000 gal (189,000 L).
  22.11.4.2 All piping connections to the tank shall be made above the maximum liquid level.

While the systems described above are shown as standalone fuel storage systems, the present invention is not so limited in this regard. In particular, in addition to storing fuel, the systems may be configured to likewise dispense fuel for industrial, commercial and passenger automobile use.

Importantly, the modular fuel tank assembly described herein can be easily and quickly assembled on site to provide a fairly large fuel storage capacity. In particular, the fuel tanks may be transported separately, as modular components, and fluidly connected on-site via the connecting tanks, using bolted flanges or via welding, to provide an integrated, essentially unitary fuel storage tank with a large capacity. Additionally, it will be appreciated that modular fuel tank assembly is structurally supported not through the connecting tanks/bodies, but through the aligned struts and internal baffles of the modular fuel tank assembly.

As discussed, the design of the modular fuel tank assembly necessitates only a single pump for the dispensing of fuel, not multiple pumps for each fuel tank body. In addition to a single pump, the modular fuel tank assembly only requires a single PLC and other control components/devices. This is in contrast to existing systems, where monitoring, pumping and control devices have customarily been required for each discrete/individual storage tank. The present invention is therefore less complex, less costly, and more reliable than existing systems with similar gross capacity. Because the primary tank bodies are integrated to form a single reservoir for the storage of fuel, only a single pump, a single monitoring system (sensors, etc.) and single control system are needed). This is in contrast to existing facilities where each tank must be monitored separately, and upon emptying of one tank, a fairly complex switching operation must be carried out to discharge fuel from a different tank.

Figure 7:
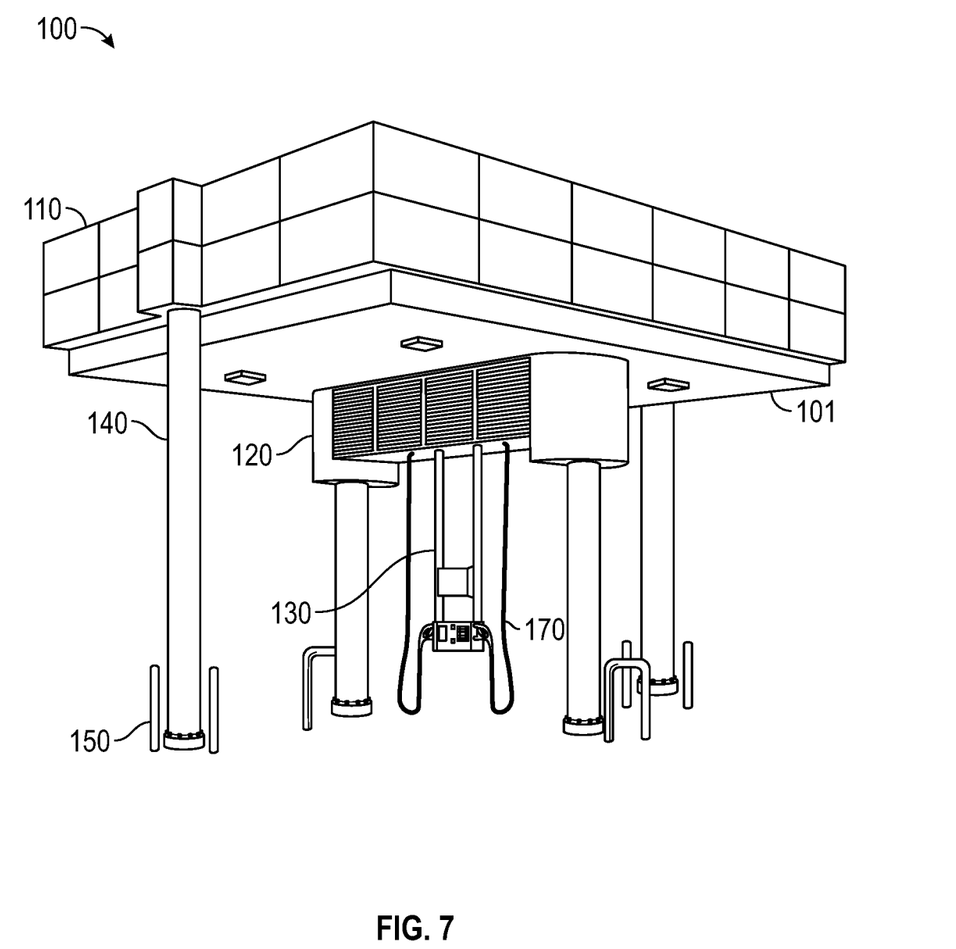
FIG. 7 is an isomeric view of a fuel distribution station in accordance with one embodiment of the present invention.
Figure 8:
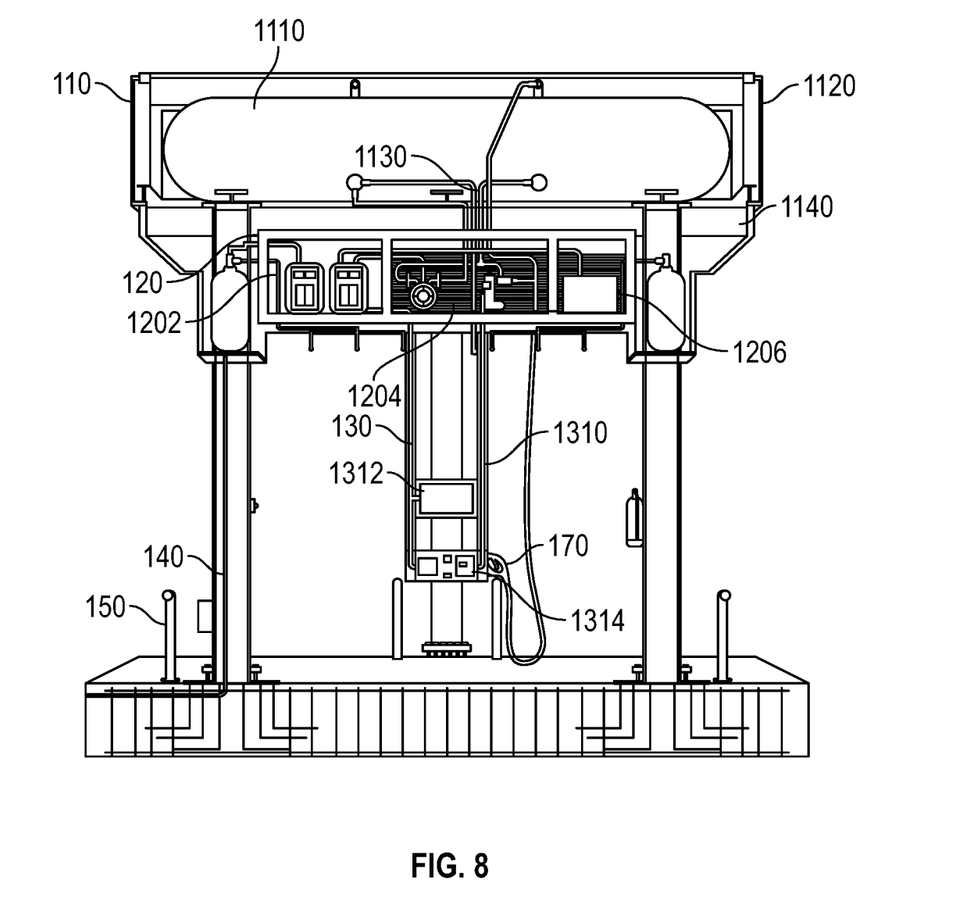
FIG. 8 is a cross-sectional view of the fuel distribution station of FIG. 1.

FIGS. 7 and 8 illustrate one embodiment of a fuel distribution station 100 within which the modular fuel tank assembly of the present invention may be integrated. With specific reference to FIG. 7, the fuel distribution station 100 includes an upper canopy 101, a fuel distribution interface 130 suspended from the upper canopy 101, a fuel dispenser 170 in close association with the fuel distribution interface, a plurality of supporting structures 140 that support the upper canopy 101 in an elevated position above the ground so as to permit the passage of vehicles beneath the upper canopy 101, and a plurality of protective columns or bollards 150 for the protection of the supporting structures 140. The upper canopy 101 further includes a fuel tank dock 110 where one or more fuel tanks are located, and an equipment bay 120 in close association with the fuel tank dock 110 (e.g. beneath the fuel tank dock 110).

Turning to FIG. 8, one embodiment of the fuel distribution station 100 includes the fuel tank dock 110 generally being comprised of an outer shell 1120, at least one fuel compartment 1110 of the modular fuel storage apparatus located within the outer shell 1120, and a fire shield wall 1140. The fuel compartments 1110 of the modular fuel storage apparatus are in fluid communication with the fuel distribution interface 130 and the equipment bay 120 via fueling pipes 1130. The outer shell 1120 is preferably made of materials that are fireproof and ballistic-proof, such as those known in the art. The fire shield wall 1140 is disposed between the outer shell 1120 of the fuel tank dock 110 and the equipment bay 120, so as to isolate the fuel tanks 1110 and the equipment bay 12 from each other. As will be appreciated, and owing to the double-walled and ballistic/fire-resistant properties of the modular fuel tank assembly of the present invention, other embodiments of the present invention do not require either the outer shell 1120 or the fire shield wall 1140. Other modifications to the components shown in FIG. 8 are also contemplated without departed from the broader aspects of the present invention.

As also seen in FIG. 8, and by having the fuel compartments 1110 of the modular fuel tank assembly located in the upper canopy 101 in an elevated position above the ground, the fuel distribution station of the present invention is more environmentally friendly by preventing any fuel from contaminating the soil and underground water in the area surrounding the fuel distribution station, as compared to conventional fuel stations whose fuel tanks are buried in the ground.

More importantly, it shall be noted that it is easier and cheaper to perform any maintenance work and/or repairs on any part of the modular fuel tank assembly compared to conventional fuel stations, as the fuel compartments 1110 are located in the upper canopy 101 and are easily accessible, while the fuel tanks in a conventional fuel station are buried underground and a thick block of covering concrete has to be broken in order to gain access to the fuel tanks. In addition, the financial and labor cost for building the fuel distribution station 100 of the present invention is significantly lower than that for building a conventional fuel station, as building of the fuel distribution station 100 does not require significant excavation and underground work.

It should also be noted that electricity consumption by the mechanical pumping equipment in the present invention may be greatly reduced as compared to a conventional fuel station, as the present invention partially utilizes the weight of the fuel to distribute the fuel from overhead fuel storage apparatus to the fuel dispenser 170, while a conventional fuel station solely depends on the mechanical pump equipment for pumping the fuel from underground fuel tanks to the fuel dispenser. In particular, by locating the modular fuel storage apparatus and the fuel dispenser 170 in the canopy, above vehicles to be refueled, fuel can be dispensed almost entirely or, indeed, entirely, using the force of gravity. This is in contrast to existing fuel stations which require pumps to pump the fuel from the underground tanks, upward to the dispenser, and to a vehicle to be refueled. Accordingly, significant reductions in the amount of electricity utilized can be realized.

As shown in FIG. 8, in one preferred embodiment of the present invention, the equipment bay 120 is located beneath the fuel tank dock 110 and is elevated to a position so as to permit the passage of vehicles beneath the equipment bay when the vehicles enter into the fuel distribution station for fueling. The equipment bay 120 comprises multiple compartments 1202, 1204, 1206, etc. to accommodate different equipment including pumps, filters, and fire suppression systems (e.g., hydraulic and mechanical equipment). This equipment located inside the equipment bay 120 is in fluid communication and electrical communication with the fuel compartments 1110 of the modular fuel storage apparatus within the fuel tank dock 110, the fuel dispenser interface 130 and the fuel dispenser 170 suspended from the upper canopy 101.

It should be noted that, by locating the equipment bay 120 separately from and beneath the fuel tanks 1110 of the modular fuel storage apparatus, and by inserting the fire shield wall 1140 between the equipment bay 120 and the fuel tank dock 110, the present invention effectively prevents sparks from being generated accidentally by the hydraulic and mechanical equipment and inducing fire on the fuel tanks 1110, thereby enhancing the overall safety of the fuel distribution station. In addition, the fuel tank dock 110 is capable of providing shelter to the equipment bay 120 beneath it in different weather conditions.

Referring again to FIG. 8, a fuel distribution interface 130 is connected to and suspended from the upper canopy 101 via at least one support 1310, so as to suspend the fuel distribution interface 130 in an elevated position and in a predetermined distance above the ground. The fuel distribution interface 130 further includes an electronic digital display 1312 to digitally display information to an operator and/user of the fuel distribution station, and an input panel 1314 for the operator and/or user to input information. A fuel dispenser 170 is also suspended from the upper canopy 101 and is disposed in close association with the fuel distribution interface 130.

In an embodiment, the height of the fuel distribution interface 130 may be selectively adjustable so as to accommodate the height of the operator and/or user of the fuel distribution station 100, as well as to accommodate the height of the vehicles entering the fuel distribution station 100 for fueling. A sensor can be arranged in association with the fuel distribution station 100 (e.g., with each dispenser) to detect the height of the vehicles entering into the fuel distribution station and to transmit the height data of the vehicles to the fuel distribution interface 130. The fuel distribution interface 130 thereby is capable of adjusting its height automatically based on the height data of the vehicles entering into the fuel distribution station 100.

As disclosed above, the fuel distribution station 100 of the present invention provides a number of distinct advantages over the conventional fueling stations. First, suspending the equipment bay 120 and the fuel distribution interface 130 from the upper canopy 101 reduces the chance of a vehicle crashing into a component or components of the fuel distribution interface 130 as compared to a conventional fuel station where the pumping and fuel distribution unit/kiosks are mounted on the ground.

Moreover, by eliminating the pumping and fuel distribution units/kiosks from ground level, the fuel distribution station 100 of the present invention requires fewer protective columns/bollards and other barriers, as compared to conventional fuel stations in which each pumping and fuel distribution unit/kiosk requires a plurality of barriers for impact protection. Thus, the fuel station of the present invention requires less infrastructure, and is therefore less costly than known counterparts. Moreover, by eliminating ground based fueling kiosks, the present invention provides a more flexible traffic pattern within the footprint of the station. Therefore, a vehicle can enter the fuel distribution station 100 from various directions, and park in various angles and directions, as long as it can be reached by the fuel dispenser 170, and can exit the fuel distribution station in a number of different directions, whereas a vehicle entering a conventional fuel station from the ingress of a lane, can park only in parallel to the pumping and distribution unit for fueling purposes and exit via the lane where it parked.

Figure 9:
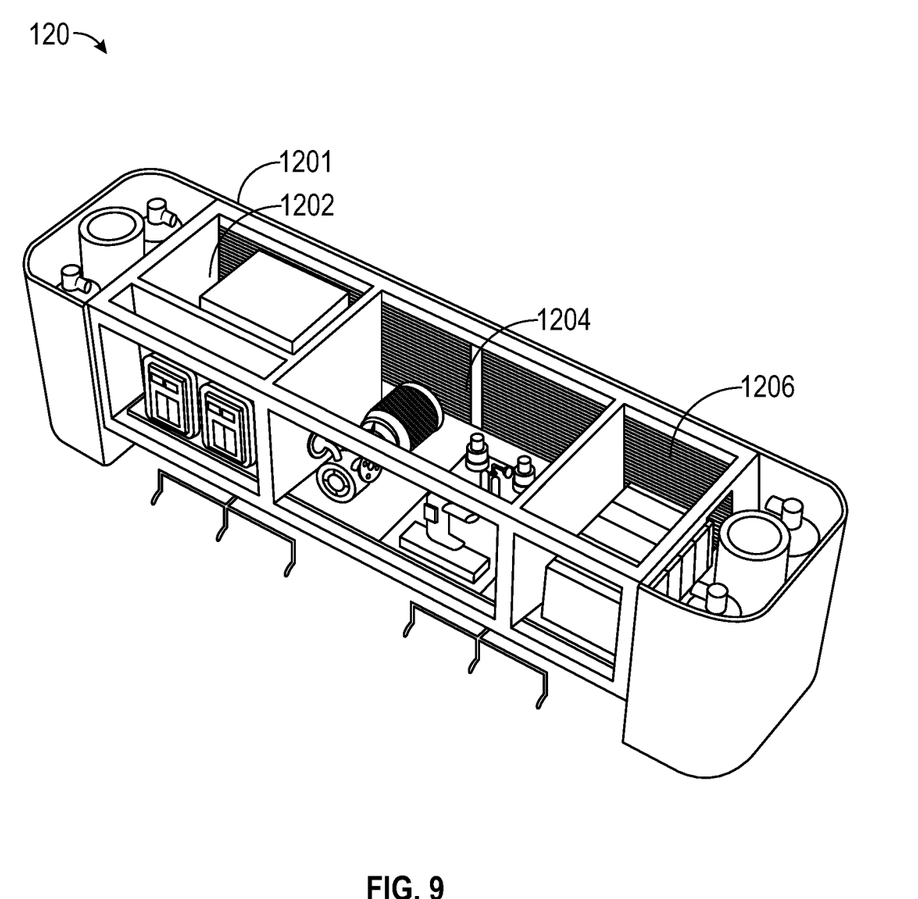
FIG. 9 is a top isomeric view of an equipment bay in accordance with one embodiment of the present invention.

Turning now to FIG. 9, the equipment bay 120 according to one embodiment comprises an equipment supporting frame 1201 which may further divide the equipment bay 120 into more than one compartment such as compartments 1202, 1204, 1206, etc. Each compartment can be the same or different in terms of shape and size. The compartments may contain equipment including, but not limited to, pumps, filters, and fire suppression systems. It shall be noted that the equipment bay 120 can be modified to accommodate hydrocarbon cracking equipment, so as to refine any known liquid hydrocarbon fuel into LPG.

While FIGS. 7-9 illustrate an exemplary fuel station in which the modular fuel tank assembly may be integrated and utilized, the present invention is not so limited in this regard. Indeed, it is contemplated that the modular fuel tank assembly of the present invention, discussed below, can be utilized in a fuel station of any type and configuration, including conventional stations where fuel storage is below ground. Moreover, it is intended that the modular fuel tank assembly disclosed herein can be utilized for fuel and/or liquid or gas storage, more generally, and is not limited to being used in conjunction with fuel stations for refilling of vehicles.

Figure 10:
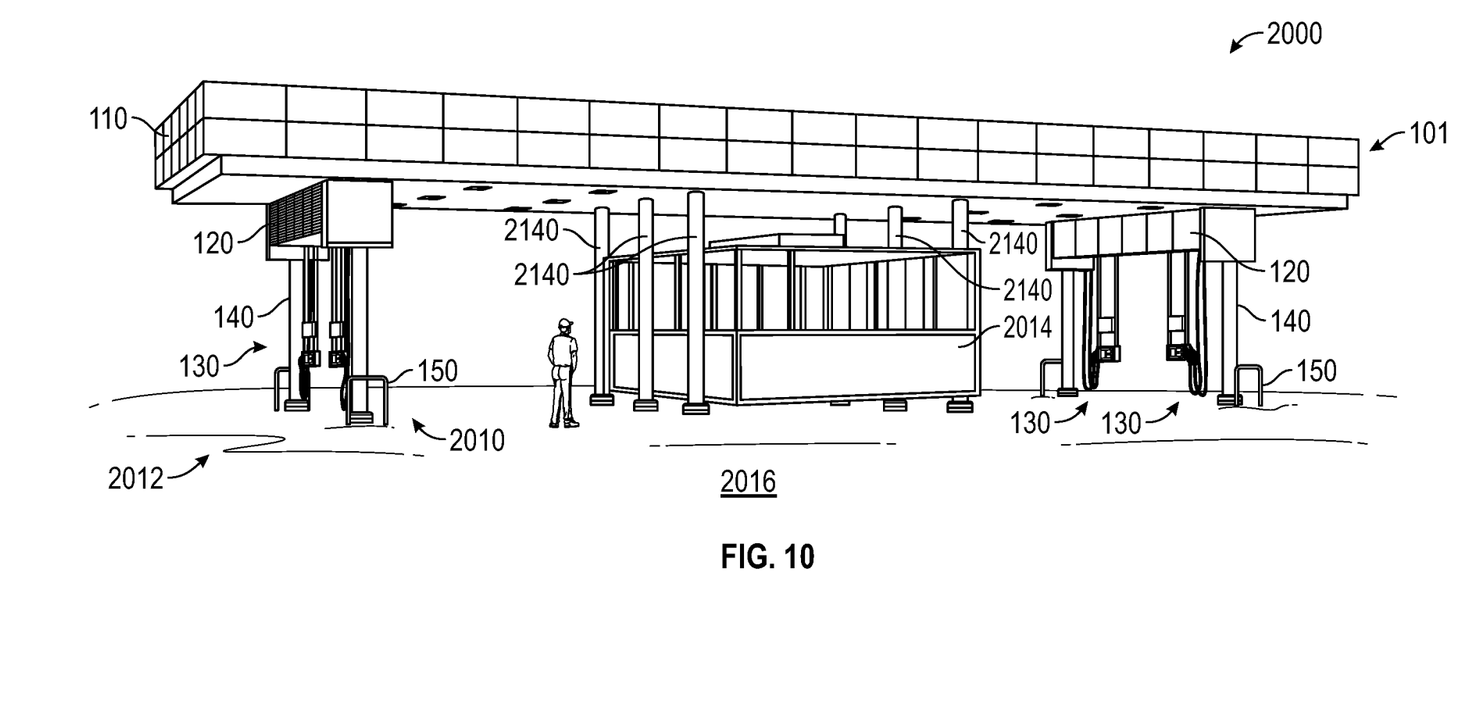
FIG. 10 is an isometric view of a fuel distribution station accordance with another embodiment of the present invention.

Turning now to FIG. 10, a fuel distribution station 2000 according to another embodiment of the present invention is shown. The fuel distribution station is generally similar in configuration to the fuel distribution station 100 discussed above in connection with FIG. 7, where like reference numerals designate like parts. In particular, the fuel distribution station 2000 includes an upper canopy 101, a plurality of fuel distribution interfaces 130 suspended from the upper canopy 101, fuel dispensers 170 in close association with each fuel distribution interface 130, a plurality of supporting structures 140 that support the upper canopy 101 in an elevated position above the ground so as to permit the passage of vehicles beneath the upper canopy 101, and a plurality of protective bumps/columns 150 for the protection of the supporting structures 140. As discussed above, the upper canopy 101 further includes a fuel tank dock 110 where one or more primary tank bodies of a modular fuel storage apparatus, such as first 401 and second 402 tank bodies, are located, and an equipment bay 120 in close association with the fuel tank dock 110 (e.g. beneath the fuel tank dock 110). The fuel tanks, supporting structures and equipment bay may be configured as above described.

As shown in FIG. 10, in an embodiment, the fuel distribution station 2000 may include a plurality of fuel distribution interfaces 130 on opposed sides of the station 2000. For example, a left side of the station may be outfitted with two split interfaces and associated dispensers 170 that are accessible from either an inner lane of ingress/egress 2010 or an outer lane of ingress/egress 2012. In this respect, each set of split dispensers 170 and interfaces 130 provides for the simultaneous distribution of fuel to up to four vehicles (two in the inner lane 2010 and two in the outer lane 2012). The right side of the fuel distribution station 2000 may be similarly configured.

As also shown in FIG. 10, the fuel distribution station 2000 may include a convenience store 2014, enclosure or similar facility elevated above the ground surface 2016. In an embodiment, the convenience store 2014 may be connected to and suspended from the upper canopy 101 in a manner similar to the fuel distribution interfaces 130, as discussed hereinbefore. Alternatively, or additionally, the fuel distribution station may include a number of additional supporting structures 2140 that help to support the upper canopy 101 in an elevated position above the ground surface 2016 as well as to support the convenience store 2014 or other facility in suspended position above the ground surface 2016. That is, the convenience store 2014 may be suspended from the canopy 101 and/or the supporting structures 2140, but in either case the convenience store 2014 is not itself anchored or otherwise attached to the ground. In an embodiment, the floor of the convenience store 2014 may rest upon the ground surface but is still only fixedly attached to the supporting structures 2140 or canopy 101.

The convenience store 2014 may include a manner of ingress and egress for consumers to enter and exit to complete purchases of fuel, food items and the like. Indeed, the convenience store 2014 may include all the amenities and offerings of traditional fuel station convenience stores.

Importantly, by suspending the modular fuel storage apparatus, dispensers, interfaces, convenience store, etc. from the canopy 101 and/or supporting structures 2140, the fuel distribution station 2000 has a very minimal environmental footprint while still being capable of offering the same services as traditional, essentially permanent fuel stations. That is, the only structures or components of the fuel distribution station 2000 that are fixed to the ground are the supporting structures 140, 2140. Accordingly, the fuel distribution station 2000 of the present invention is particularly suited for deployment in parking lots of, for example, malls and big box stores and the like, where approval for more invasive, traditional installations may be difficult to obtain.

In connection with the above, the fact that the fuel distribution station 2000 is minimally invasive, does not have a substantial 'permanent' footprint, and is fairly easy to erect and place into service encourages property owners to explore the possibility of offering fuel distribution and convenience store services on their existing properties to provide a level of one-stop-shopping heretofore not available to consumers. In addition, the financial and labor cost for building the fuel distribution station 2000 of the present invention is significantly lower than that for building a conventional fuel station, as building of the fuel distribution station does not require significant excavation and underground work, as discussed above. Accordingly, property owners can take a chance on erecting the fuel distribution station 2000 and integrated convenience store 2014 with relatively minimal expenditures as compared to existing facilities, as a means of generating additional revenues, knowing that if the station is not successful, it can easily be deconstructed and removed with minimal impact to the property. In particular, with relatively minor repairs to the surface, the property can be easily returned to its previous state and once again used for parking or the like.

Importantly, in addition to the first 401 and second 402 tank bodies, all other wall structures within the fuel distribution station 100, such as the wall structure of the supporting structures 140, the outer shell 1120 of the fuel tank dock 110, the suspending holder 1310, the equipment bay 120, etc. may themselves comprise the aforementioned double wall structure. For example, the wall of the supporting structures 140, as shown in FIGS. 7 and 8, may comprise an outer wall 1010, an inner wall 1011, and fire and ballistic resistant material 1012 such as pyrolite in-between the outer wall 1010 and inner wall 1011. Therefore, the adoption of the double wall structure enhances the overall fire and ballistic resistance of the fuel distribution station.

Although this invention has been shown and described with respect to the detailed embodiments thereof, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A modular fuel tank assembly, comprising:
    a first fuel tank body defining a first inner volume;
    a second fuel tank body defining a second inner volume, said first inner volume being spatially separate from said second inner volume;
    a connecting conduit in fluid communication with said first inner volume and said second inner volume, said connecting conduit permitting fluid transfer between said first fuel tank body and said second fuel tank body, wherein said first fuel tank body, said second fuel tank body and said connecting conduit each define a double-walled structure having an inner wall, and an outer wall spaced apart from said inner wall;
    a mounting assembly affixed to said outer walls of said first fuel tank body and said second fuel tank body, wherein said mounting assembly rigidly connects said first fuel tank body to said second fuel tank body, said mounting assembly being selectively attachable to said first fuel tank body and to said second fuel tank body; and
    a baffle disposed between said inner walls of said first fuel tank body and said second fuel tank body, wherein said baffle defines at least one aperture sized to accommodate ingress and egress of an entire human body.

2. The modular fuel tank assembly according to claim 1, further comprising:
    a pumping assembly in fluid communication with said first fuel tank body, said second fuel tank body and said connecting conduit, said pumping assembly including only a single pump effective to drain fuel from each of said first fuel tank body, said second fuel tank body and said connecting conduit.

3. The modular fuel tank assembly according to claim 1, further comprising:
    a baffle disposed between said inner walls of said first fuel tank body and said second fuel tank body; and
    said mounting assembly is affixed to said outer walls of said first and said second fuel tank bodies at a position that is approximately directly opposed to where said baffle is affixed to said inner walls within said first and said second fuel tank bodies.

4. The modular fuel tank assembly according to claim 1, further comprising:
    operative material in a space defined between said inner wall and said outer wall, said operative material being selected from the group consisting of a fire retardant material, a ballistic resistant material and a thermally insulative material.

5. A method of constructing a modular fuel tank assembly, said method comprising the steps of:
    forming a first fuel tank to have a first inner volume;
    forming a second fuel tank to have a second inner volume, said first inner volume being spatially separate from said second inner volume;
    forming a connecting conduit to fluidly connect said first inner volume to said second inner volume, said connecting conduit permitting fluid transfer between said first fuel tank and said second fuel tank;
    forming a mounting assembly affixed to said outer walls of said first fuel tank body and said second fuel tank body, wherein said mounting assembly rigidly connects said first fuel tank body to said second fuel tank body; and
    forming an interior baffle in said first inner volume and said second inner volume, wherein said mounting assembly and said interior baffles of said first inner volume and said second inner volume are longitudinally aligned with one another
    positioning a baffle between said inner walls of said first fuel tank and said second fuel tank, wherein said baffle defines at least one aperture sized to accommodate human ingress and egress of an entire human body.

6. The method of constructing a modular fuel tank assembly according to claim 5, said method further comprising the steps of:
    positioning a single pump to be in fluid communication with said first fuel tank and said second fuel tank and said connecting conduit, said single pump being effective to selectively drain fuel from said first fuel tank and said second fuel tank and said connecting conduit.

7. The method of constructing a modular fuel tank assembly according to claim 5, said method further comprising the steps of:
    depositing operative material in said space defined between said inner wall and said outer wall, said operative material being selected from the group consisting of a fire retardant material, a ballistic resistant material and a thermally insulative material.

* * * * *